United States Patent [19]

Aguilera

[11] Patent Number: 5,606,341
[45] Date of Patent: Feb. 25, 1997

[54] PASSIVE CPU COOLING AND LCD HEATING FOR A LAPTOP COMPUTER

[75] Inventor: Rafael E. Aguilera, Simpsonville, S.C.

[73] Assignee: NCR Corporation, Dayton, Ohio

[21] Appl. No.: 538,104

[22] Filed: Oct. 2, 1995

[51] Int. Cl.$^6$ .............................. H05K 7/20; G02F 1/133
[52] U.S. Cl. ........................ 345/87; 359/214; 361/699; 361/701; 361/718; 349/161
[58] Field of Search ...................... 345/214, 901, 345/87; 364/708.1; 359/49, 48, 86, 44, 43; 165/104.21; 315/112; 361/699, 701, 714, 718, 719

[56] References Cited

U.S. PATENT DOCUMENTS

| | | | |
|---|---|---|---|
| Re. 29,833 | 11/1978 | Mlavsky | 136/89 |
| 3,889,053 | 6/1975 | Lloyd et al. | 178/6 |
| 4,838,664 | 6/1989 | Graham | 350/351 |
| 4,987,289 | 1/1991 | Bishop et al. | 219/209 |
| 5,119,215 | 6/1992 | Marks et al. | 359/44 |
| 5,247,374 | 9/1993 | Terada | 359/44 |
| 5,255,109 | 10/1993 | Klein | 359/43 |
| 5,285,351 | 2/1994 | Ikeda | 361/699 |
| 5,383,340 | 1/1995 | Larson et al. | 364/708.1 |
| 5,394,936 | 3/1995 | Budelman | 165/104.33 |

*Primary Examiner*—Mark R. Powell
*Attorney, Agent, or Firm*—Michael A. Kaufman

[57] ABSTRACT

In a laptop computer, CPU-generated heat is thermally conducted passively to a radiator-like element disposed behind the LCD, which uses the heat to warm the LCD. The CPU is surrounded by a liquid-tight housing containing a biphase coolant. A first tube in fluid communication with an outlet port in the housing conveys heat-vaporized coolant to an input port on the radiator. The coolant flows through a plurality of columns formed in the radiator-like element, transferring heat and condensing in the process. The transferred heat is radiated to the LCD, which is desirably warmed in the process. The condensed coolant is conducted from an export port in the radiator-like element through a second tube to an input port in the housing. A pressure sensor may be included to provide a coolant pressure drop signal that can be used to shutdown the CPU in the event of a coolant leak.

20 Claims, 5 Drawing Sheets

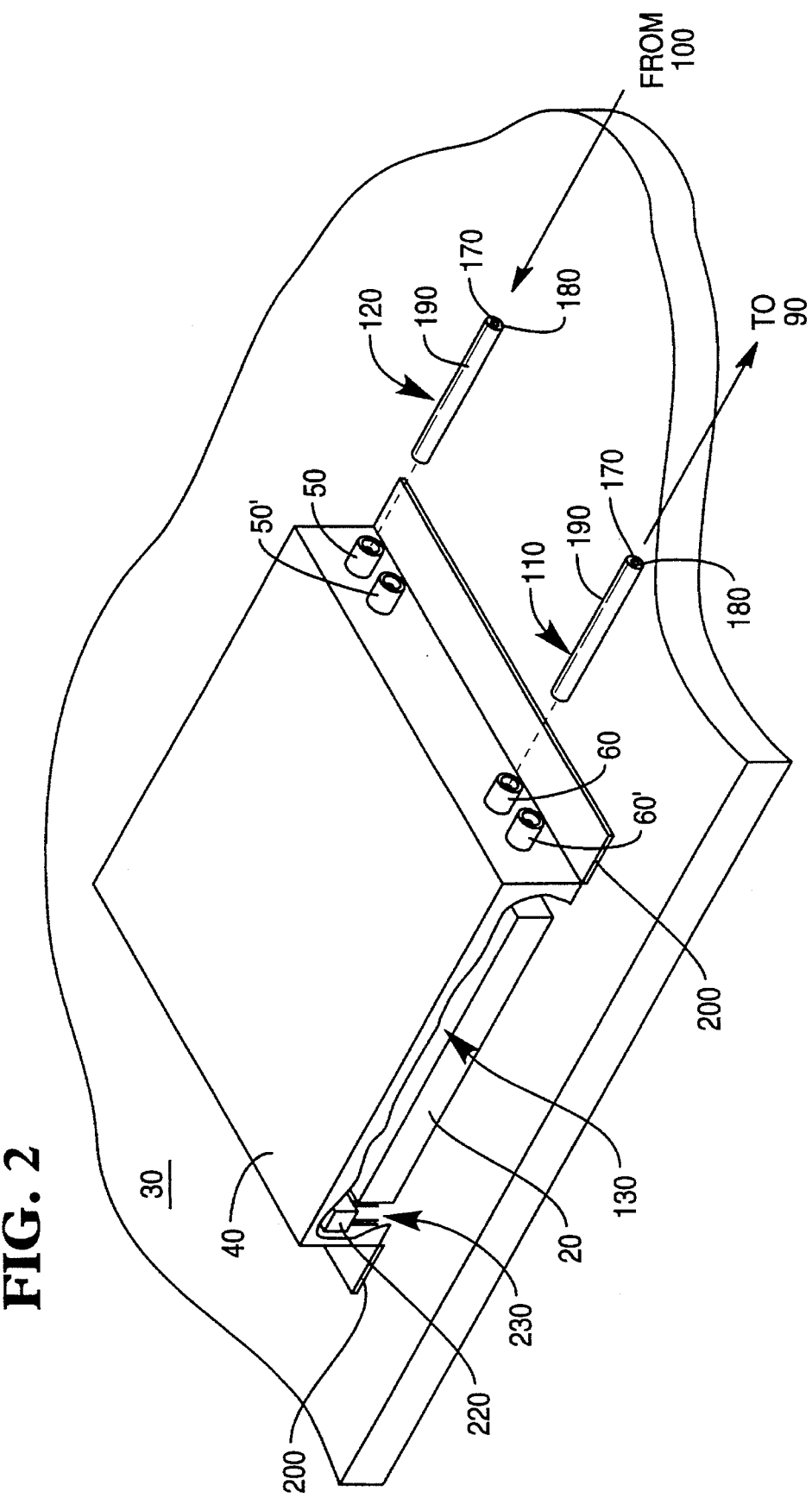

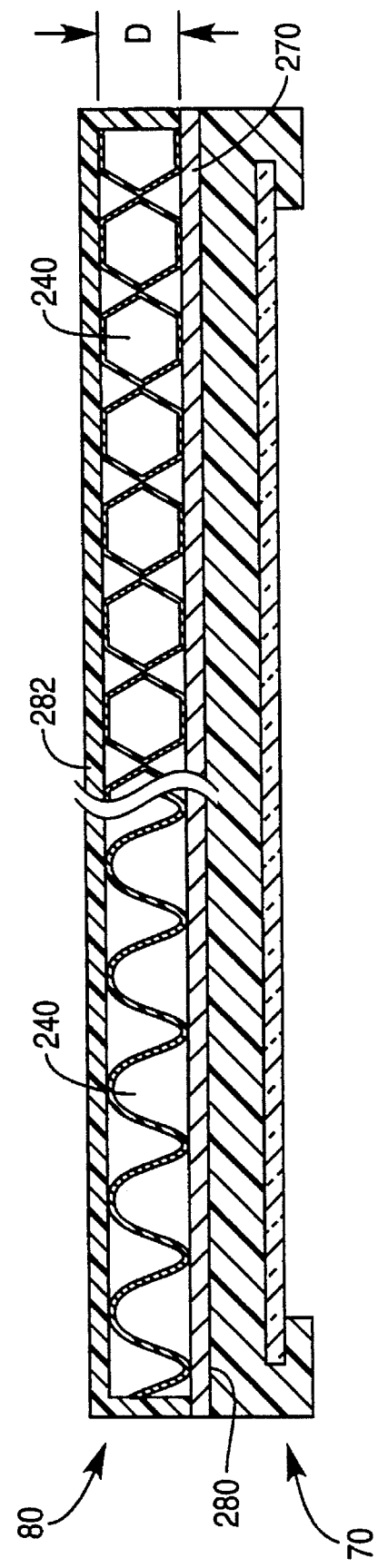

PASSIVE CPU COOLING AND LCD HEATING FOR A LAPTOP COMPUTER

FIELD OF THE INVENTION

The present invention relates generally to laptop computers with a liquid crystal display, and more specifically to such computers using high speed processors, and intended for use in environments sufficiently cold to degrade the display.

BACKGROUND OF THE INVENTION

Modern laptop computers are battery powered, and weigh less than perhaps 6 pounds (13.2 Kg), and are expected to operate for several hours before the battery requires recharging or replacement. Such computers include a high speed central processing unit ("CPU") and a liquid crystal display ("LCD"). The design of such computers involves conflicting considerations directed to cooling the CPU and to heating the LCD, while minimizing battery drain and weight.

On one hand, because the CPU is very compact and operates at a high clock rate that may exceed 50 MHz, the CPU dissipates several watts of power as heat (8 W for a "'586" or "Pentium" CPU). The surface of a '586 CPU may reach 95° C., despite the use of a heat sink and/or a cooling fan. A heat sink adds weight and adds perhaps $8 to the manufacturing cost of a laptop. A fan adds even more weight, perhaps $12 in cost, and undesirably drains perhaps 2 W power from the battery, shortening battery operating time.

In an attempt to decrease weight and to eliminate fan power consumption, CPUs are cooled using heat pipes through which fluorine or water is passively circulated. Although such techniques can cool a CPU, a leak in the cooling system can go undetected. The result is that the uncooled CPU (typically a $400 component) can overheat and self-destruct within a minute or so.

On the other hand, although it is necessary to cool the CPU, it may also be necessary to heat the LCD to prevent it from becoming sluggish or inoperable at temperatures below about −9° C. In fact, laptop computers designed to military specification include a mesh-like wire heating element disposed behind the LCD display. This heating element permits normal LCD operation at such low temperatures but consumes about 3–5 W of power from the laptop battery. Unfortunately, the power required to heat the LCD shortens the battery operating time.

Thus, there is a need for an inexpensive, light weight system for cooling a CPU in a laptop computer, which system permits instant detection of a cooling system failure. Further, there is a need for a system for heating a LCD in a laptop computer without using power from the laptop battery.

The present invention discloses a system that fulfills both of these needs.

SUMMARY OF THE INVENTION

The present invention passively cools a CPU, and conducts the CPU-generated heat to the LCD, where the heat is dissipated and used to warm the LCD permitting normal display function at low ambient temperatures. The present invention includes a CPU-surrounding housing connected by flexible tubes to a radiator-like honeycombed element adjacent the LCD, and a coolant that circulates passively between the housing and the radiator.

The CPU is surrounded by the liquid-tight housing, which has having inlet and outlet ports. These ports are coupled to first ends of the flexible tubes, whose second ends are coupled to outlet and inlet ports of the radiator. The radiator includes a plurality of heat conducting thin walled columns. A preferably biphase coolant circulates passively within the cooling system defined by the housing, tubes, and radiator. Within the house, Heat from the CPU is transferred to the coolant. The heat vaporizes the coolant, which flows passively through the housing outlet port, through a tube, through the radiator inlet port and into the radiator.

The coolant flows through the thin walled columns and condenses, transferring heat to the radiator. At least a portion of this CPU-generated heat is radiated to the LCD, warming it. Gravity and internal pressure help the now fluid coolant flow to the radiator outlet port, through a tube, through the housing inlet port and back into the housing. In this fashion, the CPU is cooled and the CPU-generated heat warms the LCD. If desired, a silicon gel may instead be used as a coolant.

The biphase coolant boils at constant pressure, which means any pressure drop will signal a coolant leak. Thus, one embodiment of the present invention provides a coolant pressure monitor that can instantly detect a leak in the cooling system. A pressure drop signal from this can be used to instantly shutdown the CPU, thus protecting it from thermal damage or destruction.

Other features and advantages of the invention will appear from the following description in which the preferred embodiments have been set forth in detail, in conjunction with the accompanying drawings.

BRIEF DESCRIPTION OF THE DRAWINGS

FIG. 2 is a detailed depiction of the CPU housing and coolant-carrying tubes, according to the present invention;

FIG. 3B is a cross-sectional view of the liquid crystal display and condenser shown in FIG. 3A;

DETAILED DESCRIPTION OF THE PREFERRED EMBODIMENTS

Figure 1:
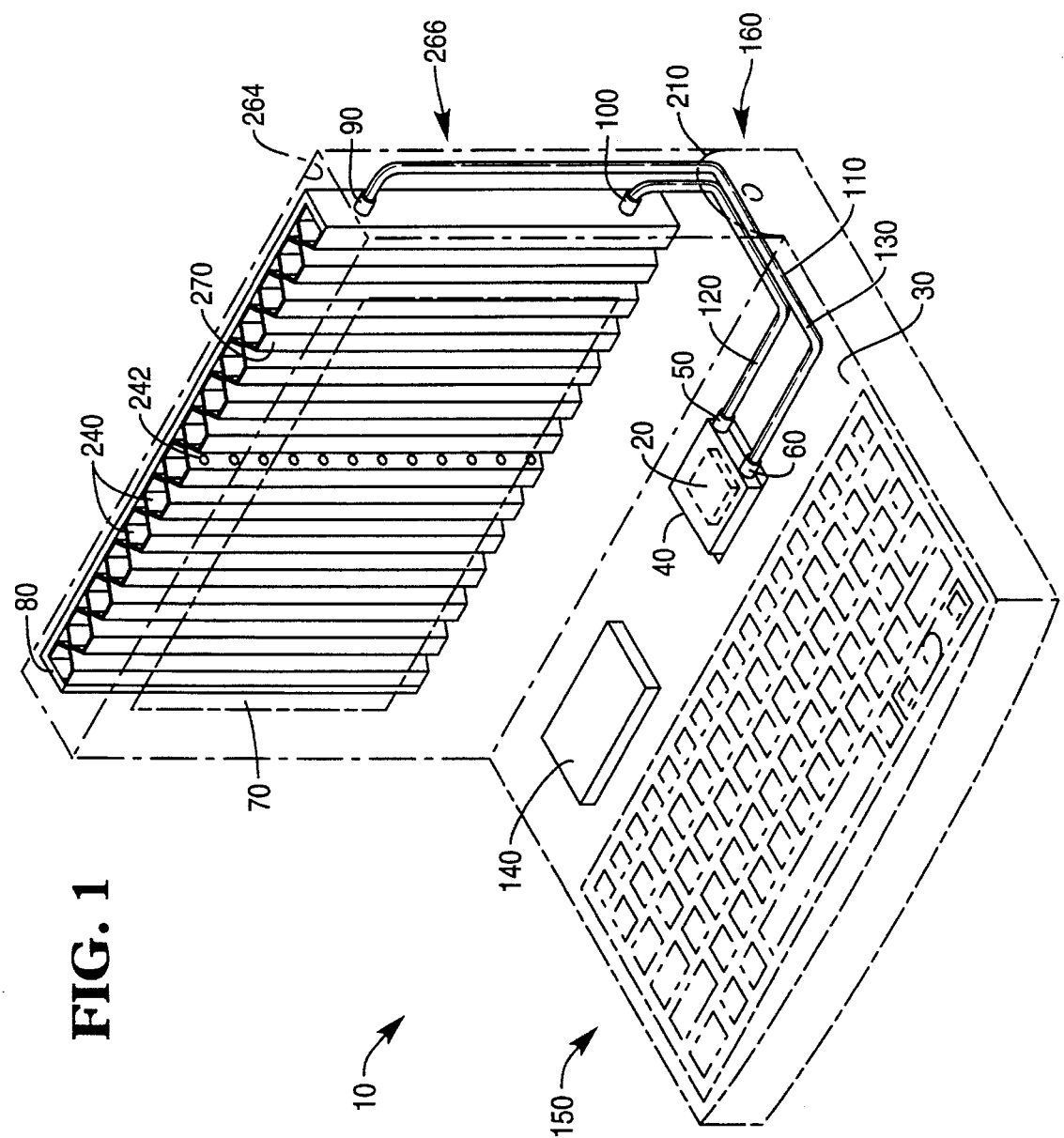
FIG. 1 is a breakaway perspective a laptop computer including a system for passively cooling the CPU and for passively heating the LCD, according to the present invention.

FIG. 1 shows a laptop computer 10 that includes a CPU 20 mounted to a motherboard 30 and surrounded by a liquid-tight CPU housing 40 having an inlet port 50 and an outlet port 60. The laptop computer also includes a LCD 70, behind which is disposed a honeycombed radiator-like element 80 having an inlet port 90 and an outlet port 100. For ease of understanding, radiator 80 is depicted as though it were lifted vertically somewhat from behind the LCD 70.

Respective port pairs 60–90 and 50–100 on housing 40 and the radiator 80 are in fluid communication via first and second coolant conducting tubes 110 and 120. A preferably biphase coolant 130 circulates passively within the cooling system defined by housing 40, tubes 110 and 120, and radiator 80. Although for ease of illustration FIG. 1 depicts a system with only two pair of tubes, and a corresponding two pair of housing and radiator ports, in practice a greater number of tubes (and ports) may be used. Laptop computer 10 is powered by a battery 140, and includes keys 150, a housing 160, as well as other components not directly involved with the present invention.

With reference to FIG. 2, housing 40 preferably is fabricated from beryllium copper, and may be bonded to the motherboard 30 with epoxy 200. Beryllium copper is preferred because of its light weight and excellent heat transfer characteristics, although other materials could be substituted. Housing 40 forms a hermetically sealed unit that surrounds CPU 20 with coolant 130. When CPU 20 is a '586, housing 40 will be approximately 17 mm long, 17 mm wide and about 3 mm high. FIG. 2 depicts an embodiment in which housing 40 includes two pairs of ports, 50, 50', and 60, 60', although a greater number of ports may of course be provided. To avoid cluttering FIG. 2, while coolant-carrying tubes 110, 120 are shown proximate ports 60 and 50, similar tubes 110' and 120' are not depicted proximate ports 60' and 50'.

As shown in FIG. 2, tubes 110 and 120 preferably are triaxial. Each tube preferably has an inner coating 170 of polyethylene, an intermediate layer 180 of Teflon™ material, and an outermost layer 190 of polyurethane. Inner coating 170 preserves purity of the circulating coolant 130 and thus promotes efficient transfer of heat generated by the CPU 20. Intermediate layer 180 further seals the coolant and promotes flexibility of tubes 120 and 130, while outermost layer 190 contributes to mechanical strength. Tubes 110 and 120 preferably are co-extruded and will each have an outer diameter of about 1/16" (1.58 mm). Alternatively, such tubes may be purchased commercially from Dow Chemical, located at Pittsburgh, Pa.

Figure 3A:
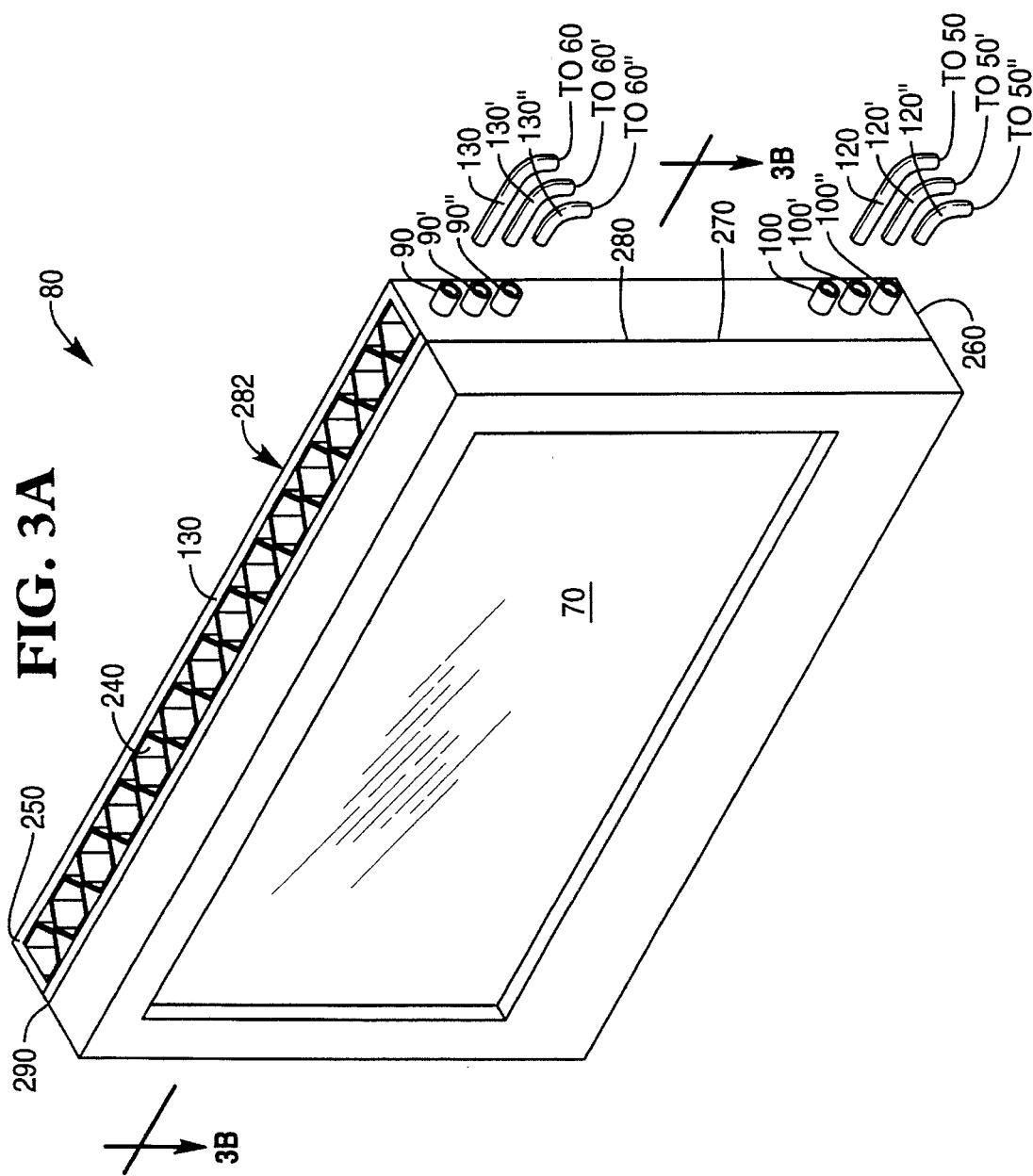
FIG. 3A depicts a radiator coupled to passively warm an LCD using CPU-generated heat, according to the present invention.

It is understood that if housing 40 provides, say, N pair of inlet and outlet ports, then N pair of tubes 110 and 120 will be present. Thus, FIG. 3A depicts a configuration in which N=3 pairs of tubes are present. The total transverse dimension of the resultant ribbon of six tubes would be approximately 3/8" (9.52 mm) by 1/16" (1.58 mm) in height. Regardless of how many tubes are used, the ribbon of tubes 110, 120 is flexible and readily permits hinging the LCD portion of the laptop from the open position shown in FIG. 1 to a closed position (not shown). However, mechanical reliability of the tube portion of the cooling system is promoted by mounting CPU 20 on a portion of motherboard 30 near the LCD hinging mechanism 210 associated with housing 160.

Preferably coolant 130 is a biphase material, such as Flourinert™ available from 3M Company, located at St Paul, Minn. Heat from CPU 20 transfers to coolant 130, which evaporates at very low pressure, e.g., 0.25 psi at 70° C. The thus vaporized coolant then moves passively through outlet port 60 into tube 110 and is delivered to inlet port 90 of the radiator 80. The coolant then passes through element 90, which radiates the conveyed heat to LCD 70. In the process of moving through element 80 and transferring its heat, coolant 130 condenses, and moves vertically downward, aided by gravity. The coolant is then conveyed by its own low internal pressure and flow in liquid form from outlet port 100, through tube 120, through inlet port 50 back into the housing 40. CPU-generated heat then re-vaporizes the coolant, repeating the heat transfer process.

Because the biphase coolant evaporates at a constant pressure, a change in pressure within the cooling system of perhaps 10% or more signals a coolant leak. Understandably, a coolant leak can cause CPU 20 to self-destruct from heat within a matter of a minute or so. Thus, a pressure monitor 220 may be mounted within, or otherwise in fluid communication with, housing 40, as shown in FIG. 2. Leads 230 from monitor 220 are coupled to the motherboard 30 and to appropriate pin or pins on the CPU 20.

Monitor 220 may be implemented as a simple pressure diaphragm, at a cost of a dollar or less. Any pressure loss will move the diaphragm, closing (or opening) an electrical contact across which voltage from battery 140 may be coupled. A low-pressure output signal from monitor 220 may be used to shutdown normal CPU operation in the event of coolant loss. Some CPUs, for example, include a pin to which a signal may be coupled to slow or even terminate normal CPU clocking. In this fashion, the CPU is automatically and inexpensively protected against thermal damage in the event of a coolant leakage.

The above-described detection of coolant loss and CPU protection is not available with prior art systems that use water or fluorine, as such coolants do not evaporate at constant pressure. As a result, any monitored pressure drop in a prior art system could mean simply that the coolant is changing phase at a different temperature, that the heat transfer has altered, or perhaps that a coolant loss has occurred.

As shown in FIGS. 3A and 3B, radiator 80 includes a plurality of vertically inclined thin walled columns 240. Preferably columns 240 include perforations 242, and are hexagon or sinusoidal shaped in cross-section. These columns preferably have a transverse column dimension of perhaps 1/16" (1.56 mm) and preferably are formed from aluminum having a wall thickness of perhaps 0.02 mm. The use of perforated columns helps promote flow of the coolant 130 within and through radiator-like element 80. If present, a useful size for perforations 242 is in the range of about 0.25 mm diameter to 0.5 mm diameter, although other than circular-shaped perforations could be used. The upper surface 250 and lower surface 260 of element 80 are spaced-apart from the uppermost and lowermost surfaces of the columns by perhaps 8" (203 mm). Upper element surface 250 is separated from the inside of upper surface 264 of the upper portion 266 of housing 160 by a gap that is sufficiently large as to not impede flow of coolant 130, e.g., perhaps about 1 mm to about 4 mm.

The column portion of radiator-like element 80 may be purchased commercially from Dupont Company, located in Wilmington, Del. The front-to-back thickness D of element 80 will be determined by strength considerations, and is perhaps 0.125" (3 mm) for a LCD that measures 10.4" (26.4 cm) diagonally.

In the embodiment of FIG. 3A, three inlet ports 90, 90', 90", three outlet ports 100, 100', 100", and six flexible tubes 130, 130', 130", 120, 120', 120" are shown. Vaporized coolant 130 enters radiator-like element 80 through tubes 130, 130', 130", and globally enters the tops of the columns 240. During laptop use, LCD 70 is oriented substantially vertically (as shown in FIG. 1), and gravity promotes downward movement of the coolant through the columns 240 within the radiator-like element 80.

As best seen in FIG. 3B, the front or LCD-facing portion 270 of element 80 is adjacent to and is sized to approximate the surface area of the rear surface 280 of LCD 70. Front portion 270 preferably is fabricated from a light weight material having good heat transfer properties, aluminum or beryllium, for example.

CPU-generated heat carried by the coolant is transferred to the aluminum thin walls defining the radiator columns, from whence the heat is coupled to the front portion 270 of element 80. CPU-generated heat coupled to front portion 270 heats the rear surface 280 of liquid crystal display 70 by conduction. Conduction and radiation help heat LCD 70 such that even in cold ambient temperature, the LCD operates normally. As the heat transfer occurs, biphase coolant 130 changes from gaseous to liquid phase, and exits the lower portion of element 80 through the outlet ports, here 100, 100', 100", assisted by gravity. The internal pressure of the coolant helps move the now lower temperature coolant through tubes 120, 120', 120" to the CPU housing 40.

As shown in FIGS. 3A and 3B, the rear portion 282 of radiator 80 preferably is a thermal insulator, such as epoxy graphite. Portion 282 helps minimize heat loss from radiator 80, other than to the liquid crystal display 70. However as shown in FIG. 3A, if desired, the efficiency of the heat transfer may be controllably reduced. Efficiency reduction is inhibited by including a quasi-heat insulator member 290 between LCD 70 and element 80. Member 290 may, for example, include regions having perforations, slits, or the like. Heat transfer through such regions is relatively efficient compared to heat transfer through the remainder of member 290.

In practice, the present invention provides a thermal resistivity of about 0.05 °C./Watt to about 0.1 °C./Watt, and can passively reduce the surface temperature of a '586 CPU from perhaps 95° C. to about 70° C. At the same time, the heat (or at least a portion of the heat) dissipated by the CPU is passively coupled to the LCD, which is desirably warmed to perhaps 65° F. (18° C.). So warmed, the LCD will operate normally at ambient temperatures at least as low as −9° C.

The cost to fabricate the present invention in quantity is perhaps $6, which is less than the cost to cool the CPU with a heat sink or fan. The weight contributed by the present invention is about 17 g for a 10.4" (26.4 cm) LCD, and about 23 g for an 11.3" (28.7 cm) LCD. Further, the present invention may be retrofitted to existing laptop computers.

It will be appreciated that the cooling aspect of the present invention may be utilized without using the CPU-generated heat to cool a LCD. The described biphase cooling system could, for example, radiate heat through a radiator-like element mounted at the bottom of the laptop computer.

Figure 4:
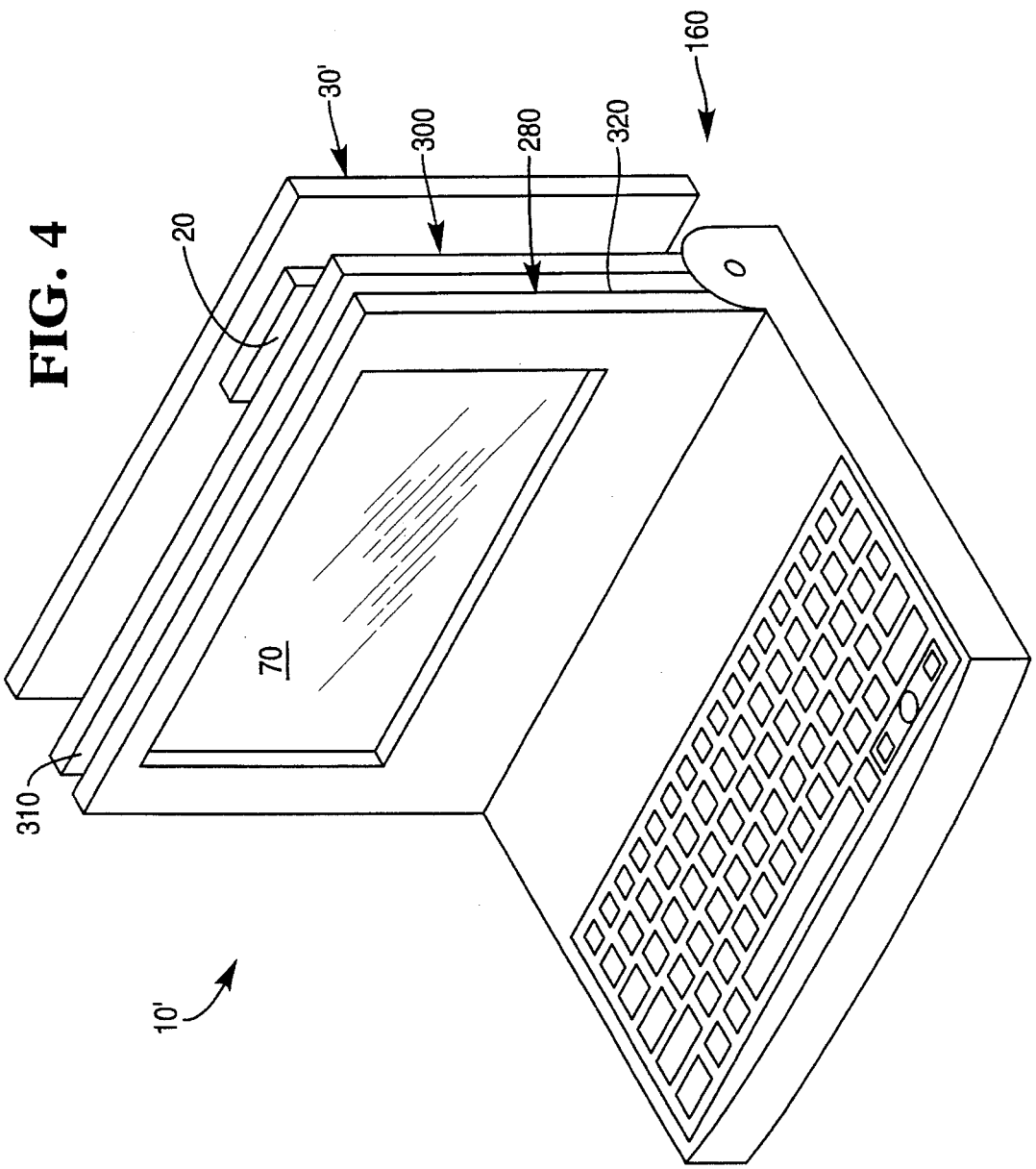
FIG. 4 depicts an embodiment in which the CPU is mounted vertically behind the LCD for passive heat transfer to the LCD, according to the present invention.

Alternatively, as shown in FIG. 4, at least the CPU-containing portion of a motherboard 30' may be mounted vertically in a laptop computer 10', with the CPU 20 facing forward. The CPU is thus placed in thermal contact with a heat radiator element 300 whose front-facing surface 310 is in thermal contact with the rear surface 280 of the LCD. Element 300 may be a plane of heat conducting material such as metal, and sinks heat from the CPU and radiates at least a portion of the heat to the rear of the LCD. If desired, a quasi-thermal insulator 280 may be provided between element 300 and the LCD to control thermal transfer therebetween. Because the CPU 20 and element 300 are in intimate physical contact, coolant 130, tubes 130, 120, and a honeycombed radiator-like element 80 may be dispensed with.

While the preferred embodiments have been described with respect to a biphase coolant, a silicon gel coolant that becomes fluid at elevated temperature could perhaps also be used. Such gels have a thermal conductivity that may be tailored by design, and have the advantage of not leaking.

Modifications and variations may be made to the disclosed embodiments without departing from the subject and spirit of the invention as defined by the following claims.

What is claimed is:

1. In a portable computer having a central processor unit (CPU) integrated circuit and a liquid crystal display (LCD), a method for passively warming the LCD with heat generated by the CPU, the method including the following steps:
   (a) disposing a heat dissipating coolant-conducting element adjacent a rear surface of said LCD, said element having an inlet port and an outlet port;
   (b) surrounding said CPU with a coolant-containing chamber having an inlet port and an outlet port;
   (c) providing a first coolant-carrying conductor coupling said outlet port of said coolant-containing chamber with said inlet port of said coolant-conducting element, and providing a second coolant-carrying conductor coupling said outlet port of said coolant-conducting element with said inlet port of said coolant-containing chamber;
   (d) providing a biphase coolant in at least a portion of a coolant path defined by said coolant-conducting element, the first and second coolant-carrying conductors, and said coolant-containing chamber;
   wherein heat generated by said CPU is carried by said coolant in the first conductor to said element where at least a portion of said heat warms said LCD, wherein said coolant changes phase and is returned by the second conductor to said chamber at a lower temperature whereat said CPU is cooled.

2. The method of claim 1, wherein step (a) includes providing a said element having a plurality of coolant-conducting columns that are vertically oriented when said LCD and said element are vertically oriented.

3. The method of claim 2, wherein said coolant-conducting columns have at least one characteristic selected from the group consisting of (i) said columns are perforated, (ii) said columns have a transverse column dimension of about 1.5 mm, (iii) said columns are formed from aluminum, (iv) said columns are formed from metal having a well thickness of about 0.02 mm, (v) said columns define a hexagon shape in cross-section, and (vi) said perforated columns define a sinusoidal shape in cross-section.

4. The method of claim 1, wherein at step (a), said inlet port is at a more elevated region of said element than said outlet port when said element and said LCD are vertically oriented.

5. The method of claim 1, wherein at step (b), said coolant-containing chamber is fabricated from material including beryllium copper.

6. The method of claim 1, wherein at step (c), at least one of said first coolant-carrying conductor and said second coolant-carrying conductor has at least one characteristic selected from the group consisting of (i) said conductor is triaxial in cross-section, (ii) said conductor includes a layer of polyethylene material, (iii) said conductor includes a layer of Teflon™ material, and (iv) said conductor includes a layer of polyurethane material.

7. The method of claim 1, including an additional step (e) of disposing a thermal insulator on a rear surface of said heat dissipating coolant-conducting element.

8. The method of claim 1, including an additional step (e) of monitoring pressure in said coolant path and at least slowing clocking of said CPU in the event of a monitored pressure drop exceeding a known threshold.

9. The method of claim 8, wherein step (e) includes mounting a pressure-sensitive diaphragm in fluid communication with said coolant path;
   wherein a pressure drop exceeding a known threshold deflects said pressure-sensitive diaphragm switching an electrical signal to said CPU to at least slow operation of said CPU.

10. In a portable computer having a central processor unit (CPU) integrated circuit and a liquid crystal display (LCD), a method for passively warming the LCD with heat generated by the CPU and for protecting the CPU against excessive heat, the method including the following steps:

(a) disposing a heat dissipating coolant-conducting element adjacent a rear surface of said LCD;

(b) surrounding said CPU with a coolant-containing chamber (c) coupling said heat dissipating coolant-conducting element with said coolant-containing chamber to provide a coolant flow path therebetween;

(d) providing a biphase coolant in at least a portion of said coolant flow path; and (e) monitoring pressure in said coolant path and at least slowing clocking of said CPU if a monitored pressure drop exceeds a known threshold;

wherein heat generated by said CPU is carried by said coolant via said coolant flow path to said element where at least a portion of said heat warms said LCD, wherein said coolant changes phase and is returned via said coolant flow path to said chamber at a lower temperature whereat said CPU is cooled; and wherein slowing said clocking protects said CPU against overheating.

11. A heat-transfer unit for a portable computer having a central processor unit (CPU) integrated circuit and a liquid crystal display (LCD), the heat-transfer unit comprising:

a heat dissipating coolant-conducting element adjacent a rear surface of said LCD, said element having an inlet port and an outlet port;

a coolant-containing chamber, surrounding said CPU, having an inlet port and an outlet port;

a first coolant-carrying conductor coupling said outlet port of said coolant-containing chamber with said inlet port of said coolant-conducting element;

a second coolant-carrying conductor coupling said outlet port of said coolant-conducting element with said inlet port of said coolant-containing chamber;

a biphase coolant occupying at least a portion of a coolant path defined by said coolant-conducting element, the first and second coolant-carrying conductors, and said coolant-containing chamber;

wherein heat generated by said CPU is carried by said coolant in the first conductor to said element where at least a portion of said heat warms said LCD, wherein said coolant changes phase and is returned by the second conductor to said chamber at a lower temperature whereat said CPU is cooled.

12. The heat-transfer unit of claim 11, wherein said element has a plurality of coolant-conducting columns that are vertically oriented when said LCD and said element are vertically oriented.

13. The heat-transfer unit of claim 11, wherein said coolant-conducting columns have at least one characteristic selected from the group consisting of (i) said columns are perforated, (ii) said columns have a transverse column dimension of about 1.5 mm, (iii) said columns are formed from aluminum, (iv) said columns are formed from metal having a well thickness of about 0.02 mm, (v) said columns define a hexagon shape in cross-section, and (vi) said perforated columns define a sinusoidal shape in cross-section.

14. The heat-transfer unit of claim 11, wherein said inlet port is at a more elevated region of said element than said outlet port when said element and said LCD are vertically oriented.

15. The heat-transfer unit of claim 11, wherein said coolant-containing chamber is fabricated from material including beryllium copper.

16. The heat-transfer unit of claim 11, wherein at least one of said first coolant-carrying conductor and said second coolant-carrying conductor has at least one characteristic selected from the group consisting of (i) said conductor is triaxial in cross-section, (ii) said conductor includes a layer of polyethylene material, (iii) said conductor includes a layer of Teflon™ material, and (iv) said conductor includes a layer of polyurethane material.

17. The heat-transfer unit of claim 11, further including a thermal insulator disposed on a rear surface of said heat dissipating coolant-conducting element.

18. The heat-transfer unit of claim 11, further including:

means for monitoring pressure in said coolant path; and means for at least slowing operation of said CPU, coupled to said means for monitoring, for slowing operation of said CPU in the event of a monitored pressure drop exceeding a known threshold.

19. The heat-transfer unit of claim 11, further including a quasi-heat insulating member disposed between a rear surface of said LCD and an LCD-facing surface of said heat dissipating coolant-conducting element;

wherein said member alters efficiency of heat transfer from said element to said LCD.

20. A portable computer, including:

a liquid crystal display (LCD);

a central processor unit (CPU);

a heat dissipating coolant-conducting element, disposed adjacent a rear surface of said LCD;

a coolant-containing chamber, surrounding said CPU;

a coolant flow path coupling said heat dissipating coolant-conducting element with said coolant-containing chamber;

a biphase coolant, occupying at least a portion of said coolant flow path; and (e) a pressure monitor coupled to monitor pressure in said coolant path and to output a signal to said CPU causing clocking of said CPU to at least slow if a monitored pressure drop exceeds a known threshold;

wherein heat generated by said CPU is carried by said coolant via said coolant flow path to said element where at least a portion of said heat warms said LCD, wherein said coolant changes phase and is returned via said coolant flow path to said chamber at a lower temperature whereat said CPU is cooled; and wherein slowing said clocking protects said CPU against overheating.

* * * * *